(12) United States Patent
Landon

(10) Patent No.: US 6,198,251 B1
(45) Date of Patent: *Mar. 6, 2001

(54) METHOD FOR SEQUENTIALLY CHARGING BATTERIES IN SITU

(75) Inventor: Frank L. Landon, Santa Ana, CA (US)

(73) Assignee: Fluor Corporation ( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/131,428

(22) Filed: Aug. 10, 1998

Related U.S. Application Data

(63) Continuation-in-part of application No. 08/868,465, filed on Jun. 3, 1997, now abandoned.

(51) Int. Cl.[7] .................................................. H02J 7/00

(52) U.S. Cl. .................................... 320/124; 320/109

(58) Field of Search .................................. 320/109, 124, 320/129, 130, 119, 120, 116; 361/684, 686

(56) References Cited

U.S. PATENT DOCUMENTS

| | | | |
|---|---|---|---|
| 3,928,791 | * 12/1975 | Mullersman | 320/119 |
| 5,202,617 | * 4/1993 | Nor | 320/109 |
| 5,206,097 | * 4/1993 | Burns et al. | 320/114 |
| 5,477,123 | * 12/1995 | Allen et al. | 320/124 |
| 5,481,174 | * 1/1996 | Martin et al. | 320/129 |
| 5,548,200 | * 8/1996 | Nor et al. | 320/109 |
| 5,621,301 | * 4/1997 | Allen et al. | 320/124 |
| 5,661,634 | * 8/1997 | Obata et al. | 361/684 |
| 5,666,530 | * 9/1997 | Clark et al. | 707/201 |
| 5,933,812 | * 8/1999 | Meyer et al. | 361/686 |
| 5,966,285 | * 10/1999 | Sellers | 361/686 |

* cited by examiner

Primary Examiner—Peter S. Wong
Assistant Examiner—Pia Tibbits
(74) Attorney, Agent, or Firm—Fish and Associates, LLP

(57) ABSTRACT

A plurality of batteries located in battery-operated devices by a charger through a distributor where there is no communication between the distributor and the batteries in the battery operated devices are charged in automated sequence in situ by a charger through a distributor where there is no communication between the distributor and the batteries, preferably using pulsed charge technology. In preferred embodiments the pulsed charge technology includes both forward and reverse pulses.

11 Claims, 2 Drawing Sheets

METHOD FOR SEQUENTIALLY CHARGING BATTERIES IN SITU

This application is a continuation-in-part of application Ser. No. 08/868,465 filed Jun. 3, 1997 now abandoned.

FIELD OF THE INVENTION

The present invention relates to the field of battery charging.

BACKGROUND

Battery chargers generally fall into two categories—(1) direct current (D.C.) chargers and (2) pulsed current chargers.

Direct current chargers typically utilize either a constant voltage mode in which the voltage is fixed and the current varies, or a constant current mode in which the current is fixed and the voltage varies. D.C. chargers give rise to several problems, many of which can be reduced or eliminated by limiting the maximum charging current to a low-value, and extending the charge cycle up to several hours. A typical low-value charging current would be one-tenth battery capacity, i.e., where the charging current falls at the battery's nominal amp-hour capacity divided by 10 hours. Thus, a ten amp-hour battery charging at a rate of 1 amp would employ a low-value charging current. Such chargers, known as trickle chargers, are advantageous in that they obviate the need for complex control schemes, and minimize the danger of reaching an overcharge condition. This is especially true in the constant voltage mode since current will reduce even further as battery voltage approaches the voltage of the charging source. The main drawback of trickle chargers is the inconvenience of being unable to use the battery for the 8 to 18 hours that are typically required to recharge, or alternatively, the expense of procuring additional battery packs to act as replacements during the recharge cycle. These disadvantages are especially relevant with respect to electric vehicle such as golf carts in which the batteries form an integral part of the device, or are relatively large and difficult to handle.

Trickle chargers, along with other D.C. chargers, are also problematic in that they tend to cause chemical breakdown (electrolysis) of the electrolyte. The phenomenon is common to all forms of rechargeable batteries, but is most commonly recognized in lead-acid batteries. In electrolysis, gasses form a boundary layer at the electrodes and interfere with the recharging process. The build-up of gasses increases the apparent impedance of the battery and causes current related heating that may result in failure of internal structures, or in the most severe case, an explosion. Even without damage or danger of explosion, the gasses may require venting and are generally hazardous. Electrolysis may also cause loss of electrolyte which is deleterious to the battery chemistry, causing reduced battery life and increased maintenance costs.

In pulsed battery chargers, the charging current is turned on and off periodically, thus allowing the gasses sufficient time to recombine into the electrolyte solution. A further improvement can be achieved by utilizing the period of recombination to apply short discharge pulses to the battery to "clean-up" the newly plated material, thereby eliminating contaminants and nodules in the plated matrix. This technique was originally developed and patented by G. W. Jernstedt (assigned to Westinghouse Electric) between 1948 and 1954, and adapted to battery chargers by W. B. Burkett and others (assigned to Christie Electric Corp) around 1971.

An added benefit of pulsed charging is that it allows much higher current density in the charge pulse, which may significantly reduce the charge time. There are practical considerations such as current carrying capacity of the internal battery structure that must be observed, so extremely short charge cycles (less than 0.1 hour) are rarely practical, but still may be possible. Major concern of a high rate charging system centers around when to stop charging, since even a moderate overcharge will cause battery temperature to rise drastically, and can cause explosion. Traditional approaches have been to stay on the safe side and terminate the charge before peak capacity has been achieved. More complex control schemes have been devised (e.g. U.S. Pat. No. 4,746,852 to Martin), but are largely limited to specific battery types where the charge curve is predictable. Many of these approaches depend on further instrumentation of the battery pack through addition of temperature sensors. In the case of the example above, identification modules are used to select a specific control mode based upon the signaling of a specific battery type. As used herein, battery type refers to the energy storage chemistry used in the battery. Popular battery types include lead-acid, nickel-cadmium, and nickel-metal-hydride chemistries.

Where multiple batteries are to be charged, there may be a significant savings in using a single charger to charge more than one battery. Concurrent charging of multiple batteries using a single charger is already known, as exemplified by common household rechargers for AAA, AA, C and D cell batteries, and as set forth in U.S. Pat. No. 4,237,409 to Sugalski (Dec. 2, 1980).

Automated sequential charging of multiple batteries using a single charger is also known, but only for ex situ batteries, i.e., batteries which are not installed in end-user equipment being powered by the batteries. U.S. Pat. No. 5,206,577 to Fish (Apr. 27, 1993), for example, describes charging of AA and other cylindrically shaped batteries by moving the batteries sequentially through discharging and charging positions under the influence of gravity or some other biasing agent. Similarly, U.S. Pat. No. 5,357,187 to Park (Oct. 18, 1994) discloses sequential charging of batteries under control of a microprocessor. The closest art uncovered to date regarding sequential in situ charging of batteries is U.S. Pat. No. 5,028,259 to Johnson et al. (Jul. 2, 1991), which describes sequential charging of two telephone batteries, one, but not both of which can be charged in situ.

Thus, despite advancements in pulsed charging, and the consequent reduction of charging times to the point that even a plurality of batteries can be realistically charged in a sequential fashion using a single charger, the automated sequential charging of in situ batteries using a single charger has escaped recognition. Thus, there is a need to provide a battery charger which can sequentially charge a plurality of batteries in situ, especially where the batteries are large, i.e., not hand held.

SUMMARY OF THE INVENTION

The present invention provides methods and apparatus in which a plurality of batteries are charged in automated sequence in situ in battery operated devices, preferably using pulsed charge technology. In preferred embodiments the pulsed charge technology includes both forward and reverse pulses.

Various objects, features, aspects and advantages of the present invention will become more apparent from the following detailed description of preferred embodiments of

DETAILED DESCRIPTION

Figure 1:
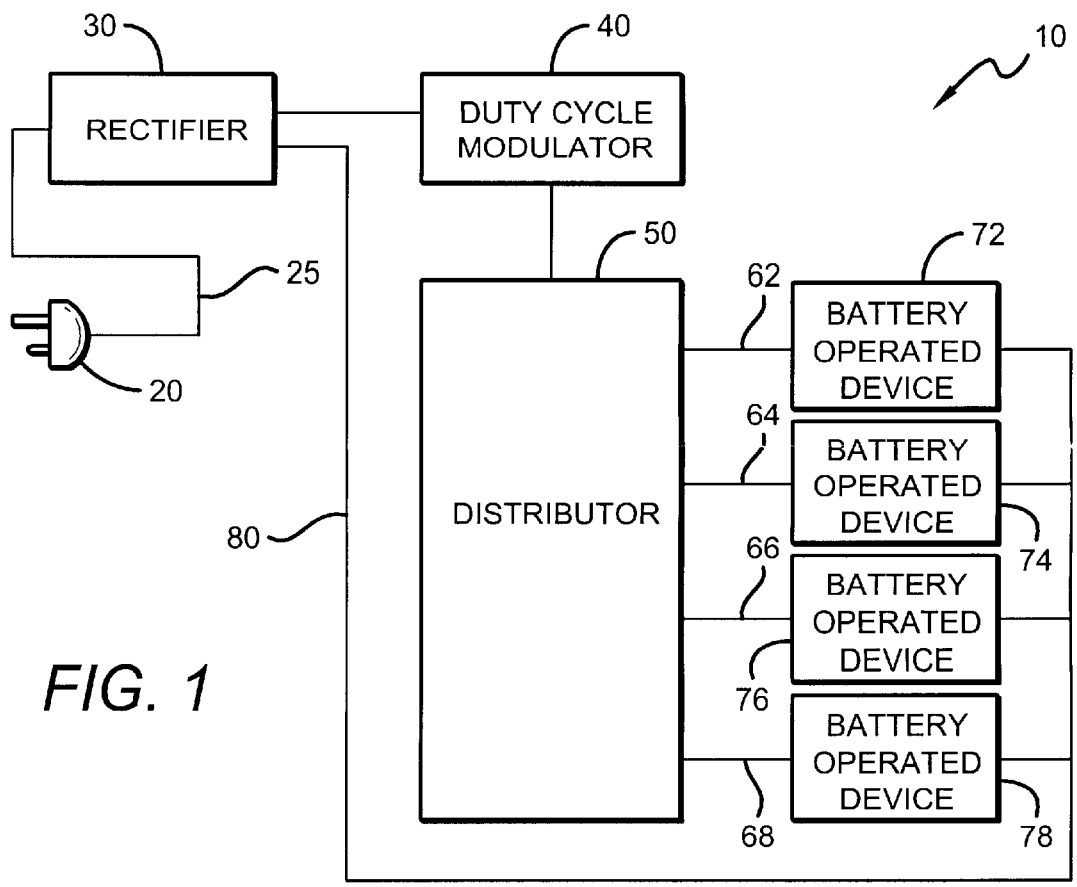
FIG. 1 is a block diagram of a sequential charging circuit according to the present invention.

In FIG. 1 a circuit 10 comprises an AC power source 20, a rectifier 30, a duty cycle modulator 40, a distributor 50, a plurality of conductors 62, 64, 66 and 68 connecting the distributor 50 to one terminal of each of a plurality of batteries 72, 74, 76 and 78, respectively, and a common conductor 80 which connects another terminal of each of the batteries 72, 74, 76 and 78 back to the rectifier, thus completing the circuit.

The AC power source 20 is presently contemplated to provide ordinary 110 Volt or 220 Volt, 60 Hz current. This is the current normally available in homes and commercial establishments such as golf courses. Other currents can also be used, however, including three-phase currents, and other voltages and frequencies available through the world. AC power source 20 is connected to the rectifier 30 via power cord 25.

The rectifier 30 is also contemplated to be conventional, although the claimed subject matter is not limited by type of rectifier. Indeed, it possible to eliminate the rectifier entirely by using a DC power source, or by directly splitting up alternating current cycles into appropriate pulses.

The duty cycle modulator 40 provides charging, and preferably also discharging pulses, to the batteries 62–68. The pulses can be provided using any number of different frequencies, voltages, waveforms, or combinations of frequencies, voltages and waveforms, and any device which can accomplish this task is contemplated to be included herein. In preferred embodiments the duty cycle modulator 40 uses pulse width modulation (PWM) of square or triangular waves to vary the duty cycle. In particularly preferred embodiments the duty cycle modulator 40 is capable of modifying the respective widths of the charge and discharge pulses at least every 1.5 seconds, and the relative energy provided by the forward (charging) and reverse (discharging) pulses is determined through look-up tables or algorithms to match the characteristics of the individual battery or batteries being charged. Parameters for such look-up tables or algorithms may include $0^{th}$ order parameters such as battery temperature, loaded and unloaded battery voltage and internal battery resistance, along with first and higher order derivatives of these parameters, and combinations of both $0^{th}$ and higher order parameters. Where temperature is used as a parameter, a thermocouple may be included within the batteries, applied externally to the batteries, or coupled to the conductors 62–68 and 80 at the battery terminals. It is presently contemplated that for most types of batteries, forward pulses will be on the order of seconds, while reverse pulses will be on the order of milliseconds.

An especially preferred modulator 40 is set forth in U.S. Pat. No. 5,739,672 to Lane (Apr. 14, 1998).

The distributor 50 sequentially directs current to batteries 72–78 using electromechanical, solid state or other technologies. There are several options here, one of which is to fully charge each battery 72–78 in sequence before beginning the charging of the next battery. This first option is desirable in that the duty cycle modulator 40 need only keep track of charging parameters for the single battery being charged.

It would be appreciated by those skilled in the art that those connections between the distributor and the batteries do not require any data communications link.

Thus, the charging sequence would be 72, then 74, then 76, and finally 78. Another option is to charge the batteries using several sequential charging cycles. Thus, batteries 72–78 may be sequentially charged (i.e, 72, then 74, then 76, then 78) approximately 10% each during a first charging cycle, then another 10% during another charging cycle, and so forth. This option has the advantage of providing at least some charge to many batteries where there is insufficient time to fully charge all of the batteries.

Figure 2:
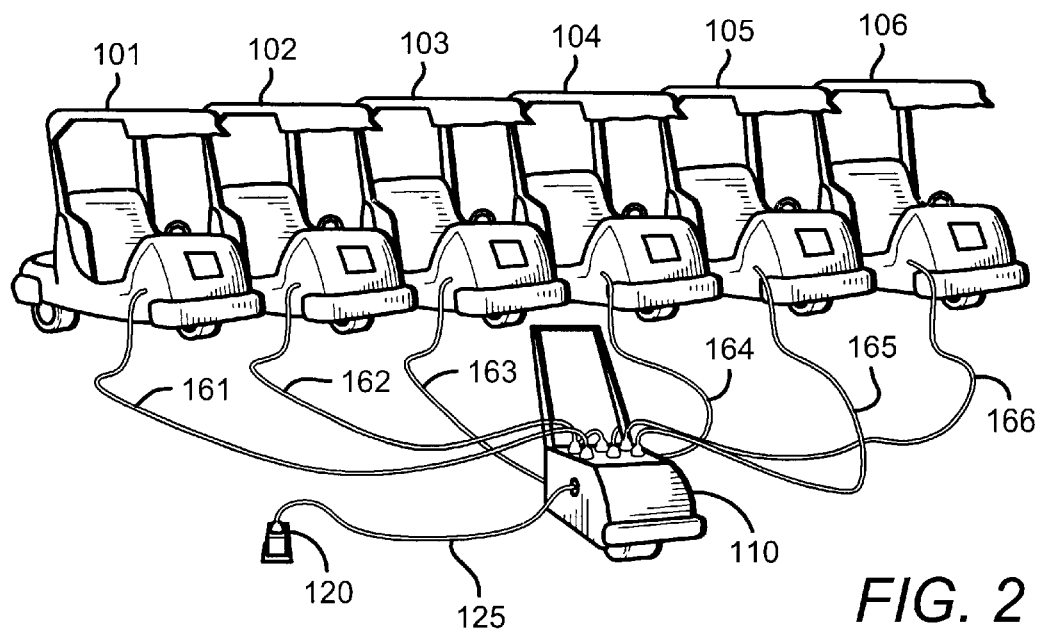
FIG. 2 is a perspective view of an exemplary embodiment of the circuit of FIG. 1.

In FIG. 2, six golf carts 101–106 are connected to a single charger 110 through cables 161–166 in a "line" configuration. The charger 110 includes components having the functions of the rectifier 30, duty cycle modulator 40 and distributor 50 described above, and is connected to a power outlet 120 via power cord 125. Of course, as with the other figures, a greater or lesser number of golf carts or other battery operated devices could be connected to the charger in a similar manner. For example the number of golf carts sequentially charged by a single charger as disclosed herein could be three, five, seven or ten.

Figure 3:
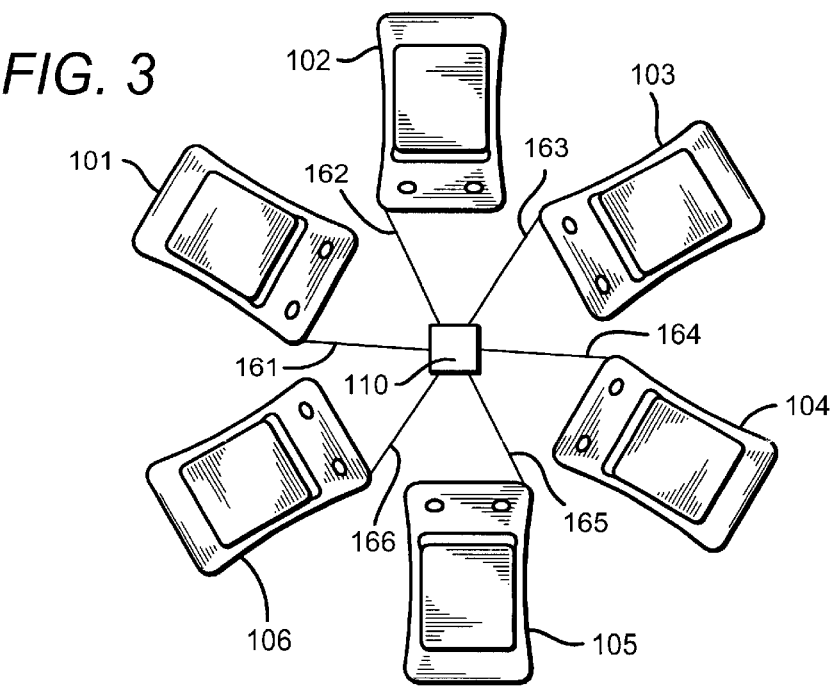
FIG. 3 is a plan view of a first alternative embodiment of the circuit of FIG. 1.
Figure 4:
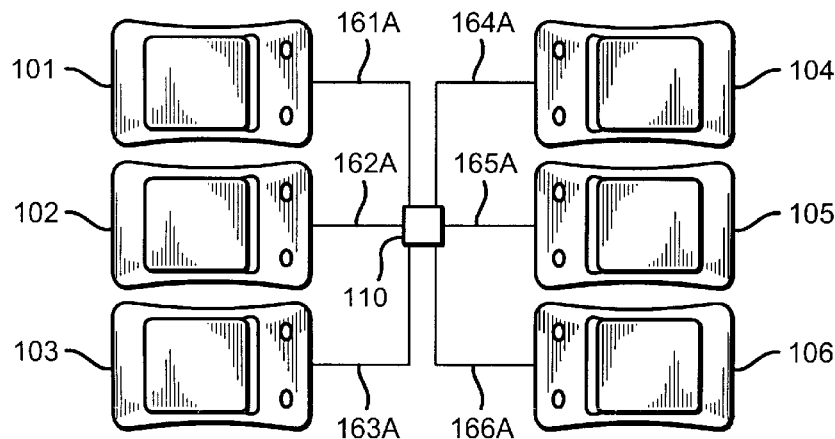
FIG. 4 is a plan view of a second alternative embodiment of the circuit of FIG. 1.
Figure 5:
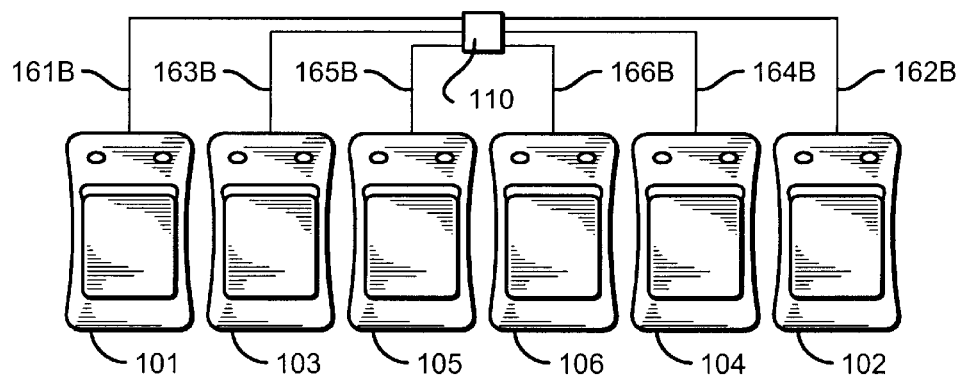
FIG. 5 is a plan view of a third alternative embodiment of the circuit of FIG. 1.

In FIG. 3, the six golf carts 101–106 are connected to charger 110 through cables 161–166 in a "circle" configuration. In FIG. 4, the six golf carts 101–106 are connected to charger 110 through cables 161A–166A in an "H" configuration. Here, carts 101–103 (technically the batteries in carts 101–103) are all charged together (in parallel as a first group, and carts 104–1063 are all charged together (in parallel) as a second group. In FIG. 5, the six golf carts 101–106 are connected to charger 110 through cables 161B–166B in a "modified line" configuration, such that carts 101–102 are charged together (in parallel) as a first group, carts 103–104 are charged together (in parallel) as a second group, and while carts 103–104 are charged together (in parallel) as a second group.

Thus, novel battery charger methods and apparatus have been disclosed herein. While specific embodiments and applications have been shown and described, it would be apparent to those skilled in the art that additional modifications are possible without departing from the inventive concepts herein.

What is claimed is:

1. A method of sequentially charging a plurality of battery operated devices, comprising:

providing a plurality of independently operable battery operated devices, each of the devices having at least one battery, providing a charger; and electrically connecting the charger to the at least one battery of each of the devices through a distributor, the distributor sequentially distributing electrical energy to the batteries without removing the batteries from the devices, and without providing any means for data communication between the distributor and the batteries.

2. The method of claim 1 wherein the electrical energy comprises pulsed charges.

3. The method of claim 2 wherein the pulsed charges comprise forward and reverse charges.

4. The method of claim 3 further comprising modulating the electrical energy using pulse width modulation.

5. The method of claim 1 wherein the devices comprise electric vehicles.

6. The method of claim 5 wherein the devices comprise golf carts.

7. The method of claim 1 wherein the step of sequentially distributing electrical energy comprises the distributor automatically sequencing charging of the batteries.

8. The method of claim 1 wherein the plurality comprises at least three batteries.

9. The method of claim 1 wherein the plurality comprises at least five batteries.

10. The method of claim 1 wherein the electrical energy comprises forward and reverse charges, and the devices comprise at least three electric vehicles.

11. The method of claim 1 wherein the step of electrically connecting the charger to the batteries comprises connecting the distributor to the batteries via flexible cables.

* * * * *